(12) United States Patent
Katsuda

(10) Patent No.: US 11,713,017 B2
(45) Date of Patent: Aug. 1, 2023

(54) SEAT FRAME INFLATOR AND AIRBAG DEVICE

(71) Applicant: Daicel Corporation, Osaka (JP)

(72) Inventor: Nobuyuki Katsuda, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/767,053

(22) PCT Filed: Apr. 20, 2020

(86) PCT No.: PCT/JP2020/017073
§ 371 (c)(1),
(2) Date: Apr. 7, 2022

(87) PCT Pub. No.: WO2021/070408
PCT Pub. Date: Apr. 15, 2021

(65) Prior Publication Data
US 2022/0363214 A1   Nov. 17, 2022

(30) Foreign Application Priority Data

Oct. 8, 2019   (JP) .................................. 2019-185447

(51) Int. Cl.
*B60R 21/217*   (2011.01)
*B60N 2/68*   (2006.01)
(Continued)

(52) U.S. Cl.
CPC ............. *B60R 21/217* (2013.01); *B60N 2/68* (2013.01); *B60R 21/207* (2013.01); *B60R 21/274* (2013.01)

(58) Field of Classification Search
None
See application file for complete search history.

(56) References Cited

U.S. PATENT DOCUMENTS 5,112,079 A * 5/1992 Haland ............. B60R 21/23138
280/730.2
5,503,428 A * 4/1996 Awotwi ................ B60R 21/207
280/739
(Continued)

FOREIGN PATENT DOCUMENTS

JP   2008-030528 A   2/2008
JP   2008030528 A *  2/2008

OTHER PUBLICATIONS

International Search Report dated Jun. 23, 2020 in International Application No. PCT/JP2020/017073, 6 pages.
(Continued)

*Primary Examiner* — Faye M Fleming
(74) *Attorney, Agent, or Firm* — Xsensus LLP

(57) ABSTRACT

The present invention provides a seat frame inflator including a seat frame housing portion formed of a seat frame having a hollow structure and forming an outer shell of a pressurized gas chamber, and a partition member disposed on a hollow side of the seat frame and configured to isolate the pressurized gas chamber and a gas chamber outer region from each other. The partition member is provided with a communication hole, and a closing member configured to close the communication hole. The seat frame inflator includes an opening member disposed on the hollow side of the seat frame, and configured to open the pressurized gas chamber, and a gas discharge port formed in the seat frame to face the gas chamber outer region and configured to discharge, from the gas chamber outer region to the outside, the pressurized gas flowing from the pressurized gas chamber.

19 Claims, 12 Drawing Sheets

(51) Int. Cl.
    *B60R 21/207*     (2006.01)
    *B60R 21/274*     (2011.01)

(56) References Cited

U.S. PATENT DOCUMENTS

| | | | |
|---|---|---|---|
| 5,588,670 A | | 12/1996 | Storey et al. |
| 5,622,381 A | | 4/1997 | Mossi et al. |
| 5,779,263 A | * | 7/1998 | Lane, Jr. ............... B60R 21/201 |
| | | | 280/730.2 |
| 2022/0410833 A1 | * | 12/2022 | Ukita .................. B60R 21/207 |

OTHER PUBLICATIONS

Written Opinion of the International Searching Authority dated Jun. 23, 2020 in International Application No. PCT/JP2020/01 7073, 6 pages.

* cited by examiner

SEAT FRAME INFLATOR AND AIRBAG DEVICE

CROSS-REFERENCE TO RELATED APPLICATIONS

The present application is based on PCT filing PCT/JP2020/017073, filed Apr. 20, 2020, which claims priority to Japanese Patent Applications No. 2019-185447, filed on Oct. 8, 2019, the entire contents of each are incorporated herein by reference.

TECHNICAL FIELD

The present invention relates to a seat frame inflator and an airbag device.

BACKGROUND ART

As an airbag device mounted on a vehicle such as a car, a side (side collision protection) airbag device has been known that expands and is inflated to restrain and protect a passenger upon a side collision. The side airbag device is normally disposed on a backrest portion (seat back) of a vehicle seat with an airbag bag body in a folded state, and expands and is inflated by actuation gas supplied from an inflator externally attached to a seat frame that forms a frame of the vehicle seat, for example.

Further, as the inflator used in the airbag device, a tyro-type inflator that generates gas by combusting it solid gas generating agent, a stored gas-type inflator that uses pressurized gas, a hybrid-type inflator acquired by combining the pyro-type inflator and the stored gas-type inflator, and the like have been known. The stored gas-type or hybrid-type inflator is a type in which a pressurized gas chamber formed inside a storage bottle or the like and storing: pressurized gas is sealed, and the pressurized gas released from the pressurized gas chamber during actuation is supplied to an airbag bag body. Thus, a space for sealing and storing the pressurized gas chamber is required.

However, because it may be difficult to sufficiently secure an attachment space of the inflator for a reduction in thickness of the vehicle seat and in response to a demand for securing a wider in-vehicle space, or the like, an inflator having a more compact structure (space-saving structure) has been desired.

In this regard, a technique for disposing an inflator in a seat frame of a vehicle seat has been known (for example, see Patent Document 1). Further, a technique for using the inside of a seat frame of a vehicle seat as a storage portion of compressed gas has also been known (for example, see Patent Document 2).

CITATION LIST

Patent Document

Patent Document 1: JP 2008-30528 A
Patent Document 2: U.S. Pat. No. 5,588,670 A
Patent Document 3: U.S. Pat. No. 5,622,381 A

SUMMARY OF INVENTION

Technical Problem

However, an airbag device disclosed in Patent Document 1 has a structure in which the inflator itself is disposed in a hollow pipe constituting the seat frame, and thus a degree of flexibility in a disposition position, a disposition range, and the like of the inflator is conceivably low. As a result, a path between a gas discharge port formed in a housing of the inflator and a gas introduction port of an airbag bag body increases, and there is a concern that it takes time to expand and inflate the airbag bag body.

Meanwhile, an airbag device disclosed in Patent Document 2 uses the inside of the seat frame as the storage portion of the compressed gas. However, compactness of the inflator may not be sufficient since an igniter is disposed outside the seat frame.

A technique according to the present disclosure has been made in view of the circumstances described above, and an object of the present disclosure is to provide a compact seat frame inflator and a compact airbag device that can quickly expand and inflate an airbag bag body during actuation.

Solution to Problem

To solve the above problems, the technique according to the present disclosure employs the following configuration. In other words, a seat frame inflator according to the present disclosure includes: a seat frame housing portion formed of at least a part of a seat frame forming a frame of a vehicle seat and also including a hollow structure, and forming an outer shell of a pressurized gas chamber filled with and air-tightly containing pressurized gas and sealed; a partition member disposed on a hollow side of the seat frame, and configured to isolate the pressurized gas chamber and a gas chamber outer region adjacent to the pressurized gas chamber from each other, in which the partition member being provided with a communication hole communicating the pressurized gas chamber and the gas chamber outer region, and a closing member configured to close the communication hole to make the pressurized gas chamber airtight; an opening member disposed on the hollow side of the seat frame to face the closing member, and configured to break the closing member during actuation to open the pressurized gas chamber; and a gas discharge port formed in the seat frame to face the gas chamber outer region, and configured to discharge, from the gas chamber outer region to the outside, the pressurized gas flowing from the pressurized gas chamber through the communication hole when the opening member opens the pressurized gas chamber.

Since the seat frame inflator that adopts the configuration described above can use the hollow region in at least a part of the seat frame as a filling space for the pressurized gas, the seat frame inflator can have a more compact structure as compared to a case where a housing for forming a housing room that houses a pressurized gas chamber and a gas generator is separately provided outside the seat frame. Therefore, the seat frame inflator can handle a reduction in thickness of the vehicle seat, and can be easily installed even under a condition where an attachment space cannot be sufficiently secured. Particularly, the opening member for breaking the closing portion during actuation is disposed on the hollow side of the seat frame, and thus the seat frame inflator can be made more compact. Further, since the seat frame inflator according to the present disclosure uses, as the housing of the pressurized gas chamber, the seat frame originally provided in the vehicle seat, a reduction in a material cost and a reduction in weight of a vehicle can be achieved.

Further, by adopting a structure in which the seat frame housing portion in the seat frame forms the outer shell of the pressurized gas chamber, and in which the hollow side of the seat frame housing portion is directly filled with the pressurized gas, a degree of flexibility in a position, a range, and the like in which the pressurized gas chamber is formed can be increased. In this way, when the pressurized gas is supplied from the gas discharge port to the airbag hag body, a supply path of the pressurized gas can be shortened, and the airbag hag body can be inflated in a short time.

Further, since the seat frame inflator according to the present disclosure has a high degree of flexibility in a position, a range, and the like in which the pressurized gas chamber is formed, and can sufficiently secure a volume of the pressurized gas chamber as described above, even when the pressurized gas chamber is filled with the pressurized gas at low pressure, the airbag bag body can be inflated in a short time during actuation of the seat frame inflator by adjusting an opening area of the communication hole and the gas discharge port, for example. Therefore, the seat frame inflator according to the present disclosure can form the seat frame housing portion filled with the pressurized gas, by using a relatively inexpensive metal material commonly used as the seat frame of the vehicle seat. Thus, a material cost of the seat frame inflator can be suitably reduced.

Here, the seat frame inflator may further include a partition wall member disposed at a distance from the partition member in the gas chamber outer region, and configured to define and form, between the partition member and the partition wall member, a gas emission region adjacent to the pressurized gas chamber, wherein the opening member may be disposed in the gas emission region, and the gas discharge port may also be formed in the seat frame to face the gas emission region.

Further, the seat frame housing portion may be formed of at least a part of a back frame constituting a frame of a back portion in the vehicle seat.

Further, the seat frame housing portion may be formed of at least a part of an upper frame constituting the back frame and extending in a left-right direction, and at least a part of an upper side frame extending downward from an end portion of the upper frame.

Further, the seat frame housing portion may be formed of the entire upper frame constituting the back frame, a part of a first upper side frame extending downward from one end of the upper frame, and a part of a second upper side frame extending downward from another end of the upper frame, the partition member may include a first partition member disposed on a hollow side of the first upper side frame and also configured to isolate the pressurized gas chamber from a first gas chamber outer region adjacent to the pressurized gas chamber, and a second partition member disposed on a hollow side of the second upper side frame and also configured to isolate the pressurized gas chamber from a second gas chamber outer region adjacent to the pressurized gas chamber, and the opening member may be disposed in the first gas chamber outer region, and the gas discharge port may also be formed in the first upper side frame to face the first gas chamber outer region.

Further, in the seat frame inflator, the opening member may be further disposed in the second gas chamber outer region, and the gas discharge port may also be further formed in the second upper side frame to face the second gas chamber outer region.

Further, the seat frame housing portion may be formed of at least a part of a cushion frame constituting a frame of a seat cushion portion in the vehicle seat.

Here, a technique according to the present disclosure can be identified as an airbag device that includes any seat frame inflator described above. In other words, an airbag device according to the present disclosure includes: any seat frame inflator described above; and an airbag bag body supplied with the pressurized gas discharged from the gas discharge port when the pressurized gas chamber is opened.

Advantageous Effects of Invention

The technique according to the present disclosure can provide a compact seat frame inflator and a compact airbag device that can quickly expand and inflate an airbag bag body during actuation.

DESCRIPTION OF EMBODIMENTS

Embodiments of a seat frame inflator and an airbag device including the seat frame inflator according to the present disclosure will be described below with reference to the drawings. Note that each of the configurations, combinations thereof, and the like in each embodiment is an example, and additions, omissions, substitutions, and other changes of the configuration may be made as appropriate without departing from the spirit of the present invention. The present disclosure is not limited by the embodiments and is limited only by the claims.

First Embodiment

Figure 1:
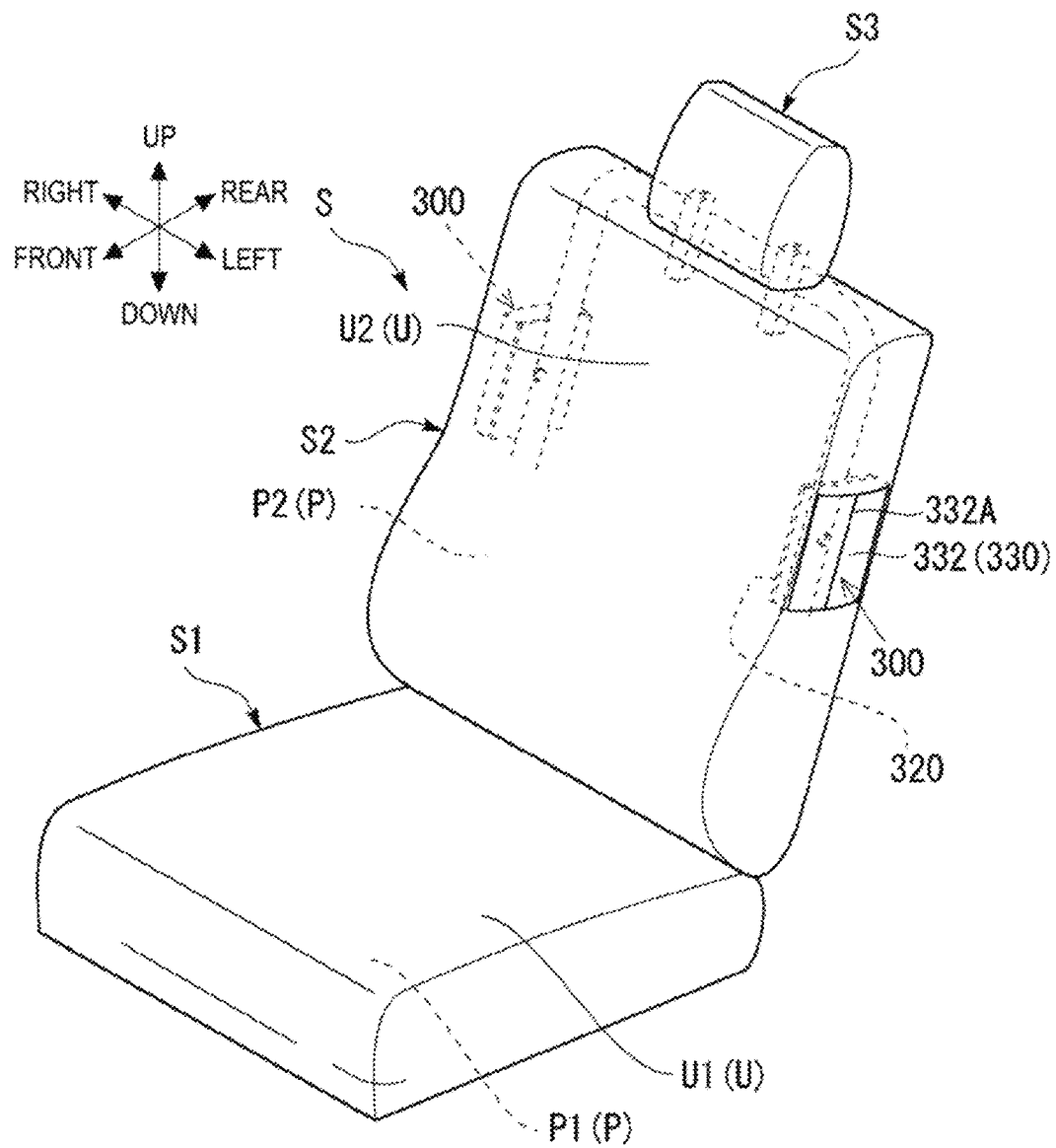
FIG. 1 is a perspective view of a vehicle seat including an airbag device according to a first embodiment.

FIG. 1 is a perspective view of a vehicle seat S including an airbag device according to a first embodiment. Note that, in the present specification, each of a front-rear direction, a left-right direction, and an up-down direction will be described with reference to each of a front-rear direction, left-right direction, and an up-down direction when viewed by a seated person who is seated on the vehicle seat S.

Figure 2:
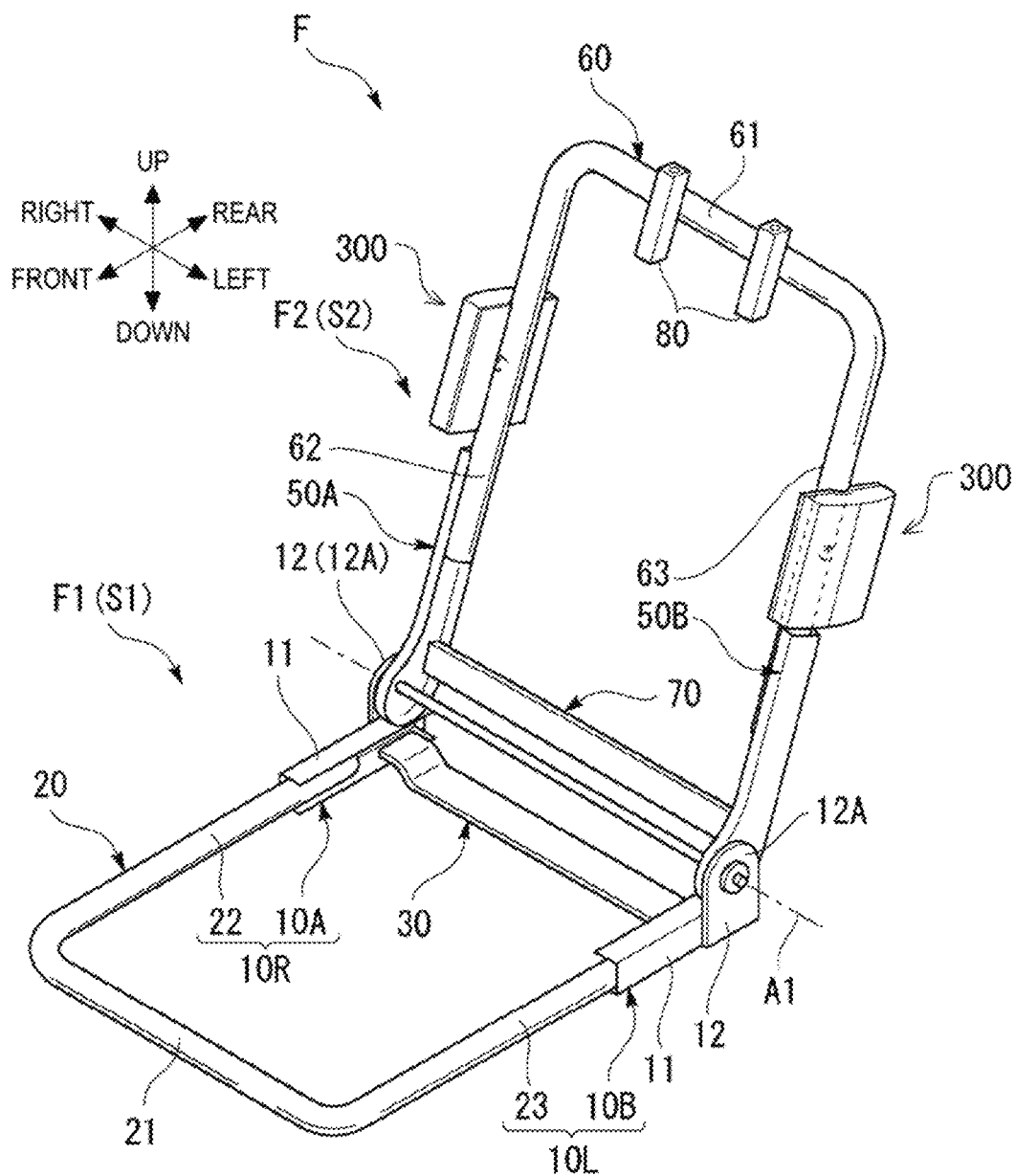
FIG. 2 is a perspective view of a seat frame in the vehicle seat according to the first embodiment.

As illustrated in FIG. 1, the vehicle seat S includes a seat cushion S1 (seat cushion portion), a seat back S2 (backrest portion), a headrest S3, and the like. A reference sign U illustrated in FIG. 1 indicates a skin material that covers each portion of the vehicle seat S. A seat frame F illustrated in FIG. 2 is housed inside the skin material U. The seat frame F is a frame member that forms a frame of the vehicle seat S, and is formed of a metal in the present embodiment. FIG. 2 is a perspective view of the seat frame F in the vehicle seat S according to the first embodiment. The seat frame F is covered with a pad P formed of, for example, urethane foam or the like, and the skin material U further covers the outside of the pad P.

The pad P includes a cushion pad P1 provided on the seat cushion S1, a back pad P2 provided on the seat bad S2, and the like. Further, the skin material U is formed of an appropriate material such as fabric, leather, and the like, for example, and includes a skin material U1 of the seat cushion S1 that covers the cushion pad P1, a skin material U2 of the seat back S2 that covers the back pad P2, and the like.

Next, the seat frame F will be described with reference to FIG. 2. The seat frame F includes a cushion frame F1 that constitutes a frame of the seat cushion S1, and a back frame F2 that constitutes a frame of the seat back S2.

As illustrated in FIG. 2, the seat frame F includes the cushion frame F1 that constitutes the frame of the seat cushion S1, the back frame F2 that constitutes the frame of the seat back S2, and the like. The cushion frame F1 includes a first rear side frame 10A, a second rear side frame 10B, a first pipe frame 20, a rear frame 30, and the like.

As illustrated in FIG. 2, the first rear side frame 10A and the second rear side frame 10B are disposed away from each other on the left and right. The first rear side frame 10A and the second rear side frame 10B respectively include a main body frame 11 and a coupling frame 12. The main body frame 11 is formed of a sheet metal having a U-shape, for example, and has an elongated shape extending in the front-rear direction. Further, the coupling frame 12 is coupled to a rear portion of the main body frame 11 by welding, bolt fastening, or the like, and includes a coupling portion 12A extending upward from the rear portion of the main body frame 11. Further, the back frame F2 is coupled to the coupling portion 12A of the coupling frame 12.

The first pipe frame 20 is a frame that couples front portions of the first rear side frame 10A and the second rear side frame 10B to each other. The first pipe frame 20 is formed by, for example, bending a metal hollow pipe material into a U-shape. In the present embodiment, the first pipe frame 20 has a cylindrical cross section, but a cross-sectional shape of the first pipe frame 20 is not particularly limited. The first pipe frame 20 includes a front frame 21 extending to the left and right, a first front side frame 22 and a second front side frame 23 that extend rearward from left and right end portions of the front frame 21, and the like. A rear end side of the first front side frame 22 in the first pipe frame 20 is joined to a front end side of the first rear side frame 10A by welding or the like. Further, a rear end side of the second front side frame 23 is joined to a front end side of the second rear side frame 10B by welding or the like.

The mar frame 30 is formed of a sheet metal, for example, and has an elongated shape extending; to the left and right. The rear frame 30 couples rear portions of the first rear side frame 10A and the second rear side frame 10B to each other. Specifically, a right end portion of the rear frame 30 is coupled to the rear portion of the first rear side frame 10A by welding or the like, and a left end portion of the rear frame 30 is coupled to the rear portion of the second rear side frame 10B by welding or the like. Note that, in the cushion frame F1, a support member (not illustrated) such as a spring and wire for supporting, from below, a seated person who is seated on the vehicle seat S may be disposed between the first front side frame 22 and the second front side frame 23 or between the front frame 21 and the rear frame 30, for example, and the cushion pad P1 may be placed on the support member.

Next, the back frame F2 will be described with reference to FIG. 2. The back frame F2 includes a first lower side frame 50A, a second lower side frame 50B, a second pipe frame 60, a lower frame 70, and the like.

As illustrated in FIG. 2, the first lower side frame 50A and the second lower side frame 50B are formed of a sheet metal or the like, and have an elongated shape extending vertically. The first lower side frame 50A and the second lower side frame 50B are disposed away from each other on the left and right.

The second pipe frame 60 is a frame that couples upper portions of the first lower side frame 50A and the second lower side frame 50B to each other, and is formed by, for example, bending a metal hollow pipe material into a U-shape. In the present embodiment, the second pipe frame 60 has a cylindrical cross section, but the cross-sectional shape of the second pipe frame 60 is not particularly limited. The second pipe frame 60 includes an upper frame 61 extending to the left and right, a first upper side frame 62 and a second upper side frame 63 that extend downward from left and right end portions of the upper frame 61, and the like. A lower end side of the first upper side frame 62 in the second pipe frame 60 is joined to an upper end side of the first lower side frame 50A by welding or the like. Further, a lower end side of the second upper side frame 63 is joined to an upper end side of the second lower side frame 50B by welding or the like.

Further, a pair of brackets 80 are attached to an outer surface of the upper frame 61 in the second pipe frame 60 by welding or the like. The bracket 80 is a cylindrical member for inserting and attaching a pillar (not illustrated) of the headrest S3. Further, the lower frame 70 is a frame that couples lower portions of the first lower side frame 50A and the second lower side frame 50B to each other, and has an elongated shape that is long to the left and right. Both ends of the lower frame 70 are joined respectively to the first lower side frame 50A and the second lower side frame 50B by welding or the like. Further, a lower portion of the back frame F2 is rotatably coupled to a rear portion of the cushion frame F1 with, as the center, a rotation axis line A1 extending in the left-right direction.

In the seat frame F constituted as described above, the airbag device 1 is provided on the back frame F2. Details of the airbag device 1 will be described below. The airbag device 1 includes an inflator 100, an airbag module 300, and the like.

The airbag module 300 includes an airbag bag body and a module case that houses the airbag bag body. In the present embodiment, the airbag module 300 is fixed to each of the first upper side frame 62 and the second upper side frame 63 in the back frame F2 each via an attachment bracket. Details of the airbag module 300 will be described below.

Figure 3:
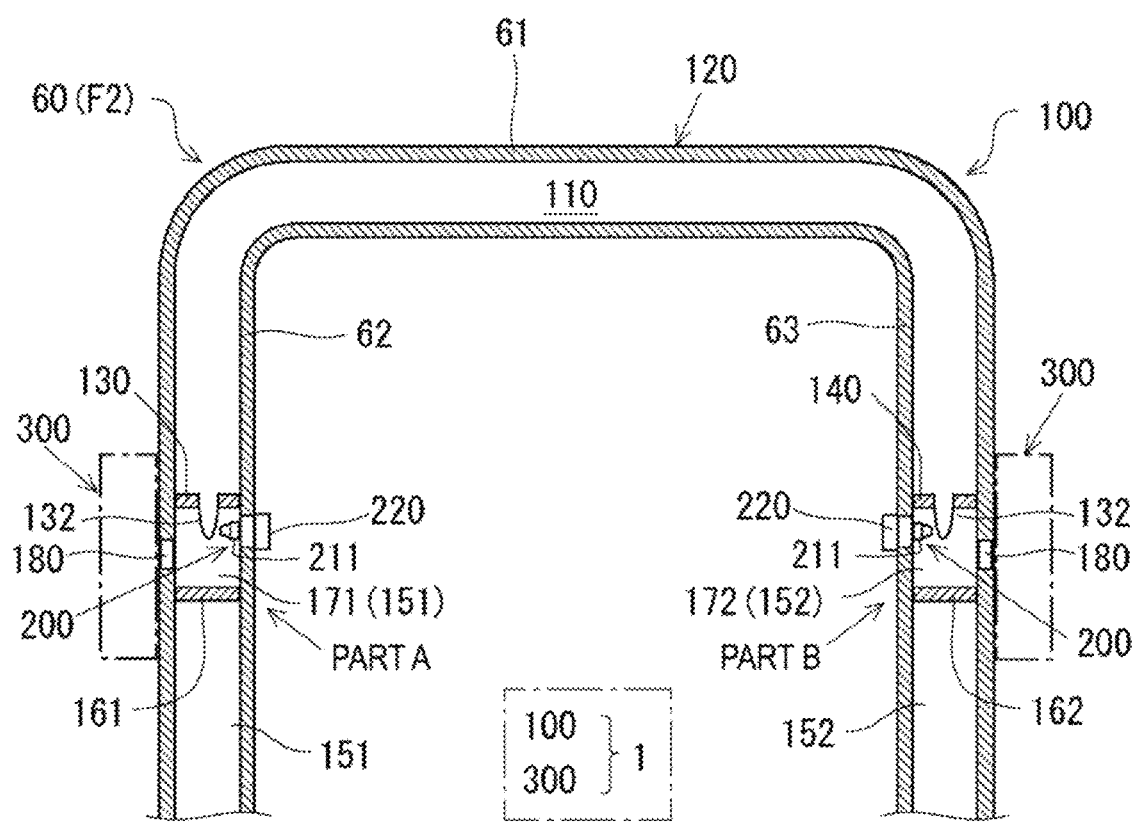
FIG. 3 is a schematic configuration diagram of an inflator in the airbag device according to the first embodiment.

FIG. 3 is a schematic configuration diagram of the inflator 100 in the airbag device 1 according to the first embodiment, and illustrates a longitudinal cross section of a part of the back frame F2. The inflator 100 is configured to include an initiator 200 and a seat frame housing portion 120 that forms a pressurized gas chamber 110 which is filled with pressurized gas and sealed. In the present embodiment, the seat frame housing portion 120 is a part of the second pipe frame 60 having a hollow shape in the back frame F2, and the pressurized gas chamber 110 is formed on a hollow side (inside) of the seat frame housing portion 120. In other words, the seat frame housing portion 120 in the second pipe frame 60 functions as a housing that forms an outer shell of the pressurized gas chamber 110, and functions as a frame member of the vehicle seat S.

Figure 4:
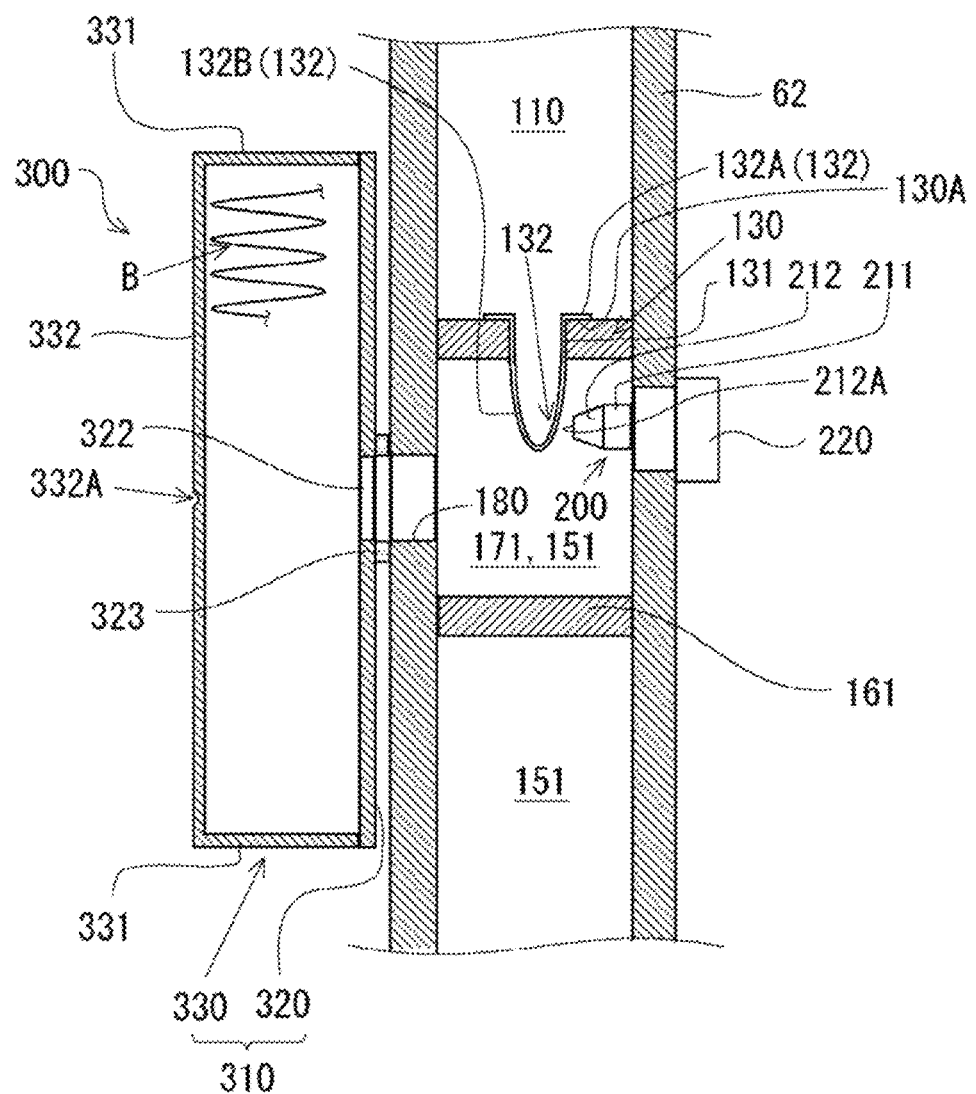
FIG. 4 is an enlarged view of a part A in FIG. 3.
Figure 5:
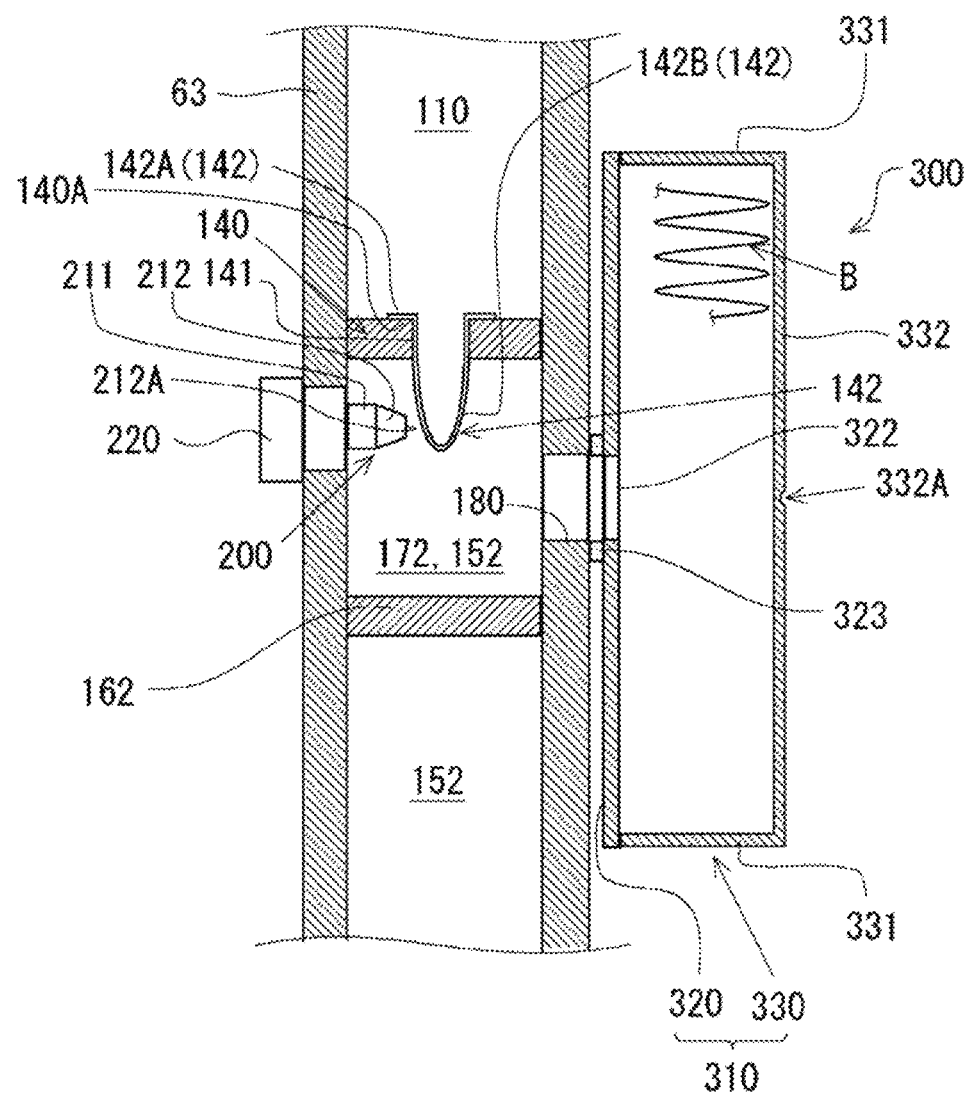
FIG. 5 is an enlarged view of a part B in FIG. 3.

FIG. 4 is an enlarged view of a part A in FIG. 3. FIG. 5 is an enlarged view of a part B in FIG. 3. A first partition member 130 and a second partition member 140 are provided on the hollow side of the first upper side frame 62 and the second upper side frame 63 in the second pipe frame 60, and thus close a transverse cross section thereof. The first partition member 130 disposed on the hollow side of the first upper side frame 62 is a metal disc member having an outer diameter equal to an inner diameter of the first upper side frame 62, and is welded all around to the first upper side frame 62. The second partition member 140 disposed on the hollow side of the second upper side frame 63 is a disc member having substantially the same structure as that of the first partition member 130. The second partition member 140 has an outer diameter equal to an inner diameter of the second upper side frame 63 and is welded all around to the second upper side frame 63.

The first partition member 130 and the second partition member 140 are partition wall members that define and form the pressurized gas chamber 110 on the hollow side of the second pipe frame 60. Specifically, in a hollow region oldie second pipe frame 60, the pressurized gas chamber 110 and a first gas chamber outer region 151 adjacent to the pressurized gas chamber 110 are isolated from each other by the first partition member 130. Further, the pressurized gas chamber 110 and a second gas chamber outer region 152 adjacent to the pressurized gas chamber 110 are isolated from each other by the second partition member 140.

As illustrated in FIG. 3, a central portion of the first partition member 130 is provided with a first communication hole 131 communicating the pressurized gas chamber 110 and the first gas chamber outer region 151 by penetrating the first partition member 130 in a plate thickness direction. The first communication hole 131 of the first partition member 130 is closed by a first rupture disc 132 as a closing member. The first rupture disc 132 is a thin metal plate member formed of an appropriate metal material such as stainless steel, a nickel alloy, and the like. The first rupture disc 132 is configured to include a peripheral portion 132A welded to an opening peripheral portion 130A formed around the first communication hole 131 in the first partition member 130, and a rupture disc main body portion 132B connecting to the peripheral portion 132A. The rupture disc main body portion 132B usually has a bell shape, and protrudes toward the first gas chamber outer region 151 side through the first communication hole 131.

Similarly, a central portion of the second partition member 140 is provided with a second communication hole 141 communicating the pressurized gas chamber 110 and the second gas chamber outer region 152 by penetrating the second partition member 140 in the plate thickness direction. The second communication hole 141 of the second partition member 140 is closed by a second rupture disc 142 as a closing member. The second rupture disc 142 has substantially the same structure as that of the first rupture disc 132, and is a thin metal plate member formed of an appropriate metal material, such as stainless steel, a nickel alloy, and the like. The second rupture disc 142 is configured to include a peripheral portion 142A welded to an opening peripheral portion 140A formed around the second communication hole 141 in the second partition member 140, and a rupture disc main body portion 142B connecting to the peripheral portion 142A. The rupture disc main body portion 142B usually has a bell shape, and protrudes toward the second gas chamber outer region 152 side through the second communication hole 141.

As described above, in the hollow region of the second pipe frame 60, the region sandwiched between the first partition member 130 and the second partition member 140 is defined and formed as the pressurized gas chamber 110. Further, the first communication hole 131 in the first partition members 130 is closed by the first rupture disc 132, and the second communication hole 141 in the second partition member 140 is closed by the second rupture disc 142. Thus, the pressurized gas chamber 110 is in an airtight state, and the pressurized gas chamber 110 is filled with pressurized gas in a sealed state. Note that, as the pressurized gas with which the pressurized gas chamber 110 is filled, appropriate gas suitable for expanding and inflating an airbag, such as argon and helium, for example, can be used. Further, the pressurized gas chamber 110 is filled with the pressurized gas from a gas injection hole formed in the second pipe frame 60. Further, after filling with gas, for example, a sealing pin (not illustrated) may be inserted into the gas injection hole, and the sealing pin may also be welded to a peripheral portion of the gas injection hole, or the like to close the gas injection hole.

Note that, as described above, the pressurized gas chamber 110 in the present embodiment is located across each of the first upper side frame 62 and the second upper side frame 63 from the upper frame 61, and is thus formed as a single space having a U-shape in a plan view. In other words, the seat frame housing portion 120 as the outer shell of the pressurized gas chamber 110 is formed of the entire upper frame 61, a part of the first upper side frame 62, and a part of the second upper side frame 63.

Here, in the first gas chamber outer region 151 formed on the hollow side of the first upper side frame 62, a first partition wall member 161 is disposed at a distance from the first partition member 130. The first partition wall member 161 is a metal disc member having an outer diameter equal to the inner diameter of the first upper side frame 62, and is joined to an inner wall surface of the first upper side frame 62 by welding or the like, for example. The first partition wall member 161 is a partition wall member that partitions the first gas chamber outer region 151, and defines and forms, between the first partition member 130 and the first partition wall member 161, a first gas emission region 171 adjacent to the pressurized gas chamber 110.

Further, in the second gas chamber outer region 152 formed on the hollow side of the second upper side frame 63, a second partition wall member 162 is disposed at a distance from the second partition member 140. The second partition wall member 162 is a metal disc member having an outer diameter equal to the inner diameter of the second upper side frame 63, and is joined to an inner wall surface of the second upper side frame 63 by welding or the like, for example. The second partition wall member 162 is a partition wall member that partitions the second gas chamber outer region 152, and defines and forms, between the second partition member 140 and the second partition wall member 162, a second gas emission region 172 adjacent to the pressurized gas chamber 110.

Furthermore, a gas discharge port 180 penetrating the first upper side frame 62 in the plate thickness direction is thrilled in a position in the first upper side frame 62 corresponding to the first gas emission region 171 defined and formed by the first partition member 130 and the first partition wall member 161, and thus the gas discharge port 180 faces the first gas emission region 171. Similarly, the gas discharge port 180 penetrating the second upper side frame 63 in the plate thickness direction is formed in a position in the second upper side frame 63 corresponding to the second gas emission region 172 defined and formed by the second partition member 140 and the second partition wall member 162, and thus the gas discharge port 180 faces the second gas emission region 172. The gas discharge port 180 is an opening for discharging, from each of the gas chamber outer regions 151 and 152 (each of the gas emission regions 171 and 172) to the exterior (outside) of the second pipe flame 60 (the first upper side frame 62 and the second upper side frame 63), the pressurized gas flowing out from the pressurized gas chamber 110 through each of the communication holes 131 and 141 when the initiator 200 described below opens the pressurized gas chamber 110.

Next, the initiator 200 in the inflator 100 will be described in the present embodiment, as illustrated in FIG. 3 to FIG. 5, the initiator 200 is disposed on each of the first upper side frame 62 and the second upper side frame 63. In the present embodiment, the initiator 200 disposed on each of the first upper side frame 62 and the second upper side frame 63 has the same structure.

The initiator 200 is provided in a position corresponding to each of the first gas emission region 171 of the first upper side frame 62 and the second gas emission region 172 of the second upper side frame 63. The initiator 200 includes an ignition portion 211, a cover portion 212, a connector portion 220, and the like. The initiator 200 is fixed to the first upper side frame 62 (second upper side frame 63), and thus the ignition portion 211 and the cover portion 212 are disposed inside the first gas emission region 171 (second gas emission region 172). Further, the initiator 200 is disposed and thus faces the rupture disc main body portion 132B (rupture disc main body portion 142B) of the first rupture disc 132 (second rupture disc 142) that protrudes toward the first gas emission region 171 (second gas emission region 172) side through the first communication hole 131 (second communication hole 141) in the first partition member 130 (second partition member 140).

Here, a known ignition agent is housed in the ignition portion 211 of the initiator 200. Further, the cover portion 212 of the initiator 200 is a tubular body that connects to a front end side of the ignition portion 211. The cover portion 212 has a tapered cylindrical shape that tapers toward a tip side, and a flame release opening 212A is opened and formed in a tip thereof. For example, the initiator 200 is an electric igniter, and further includes a pair of electro-conductive pins (not illustrated). A bridge wire (resistor) is stretched between tip sides of the pair of electro-conductive pins while the tip sides are inserted into the ignition portion 211. The initiator 200 is actuated by an ignition current supplied from the outside to the pair of electro-conductive pins via the connector portion 220, causes the bridge wire to generate heat, and thus combusts the ignition agent in the ignition portion 211. Then, the ignition portion 211 has internal pressure rising due to the combustion of the ignition agent, and the ignition portion 211 is ruptured, and thus a combustion product including flame, high-temperature gas, or the like is released from the ignition portion 211. The flame released from the ignition portion 211 is released, through the flame release opening 212A of the cover portion 212, toward the rupture disc main body portion 132B (rupture disc main body portion 142B) disposed in the first gas emission region 171 (second gas emission region 172). The cover portion 212 may have a function of concentrating the combustion product toward the rupture disc main body portion 132B (rupture disc main body portion 142B). Further, as illustrated in FIG. 1 and FIG. 2 in U.S. Pat. No. 5,622,381 A, for example, an initiator (squib) including a projectile that is attached to a tip and flies during actuation may be used as the initiator 200, and may rupture the rupture disc main body portion 132B (rupture disc main body portion 142B) by flying of the projectile.

The flame release opening 212A of the cover portion 212 is disposed near the rupture disc main body portion 132B (rupture disc main body portion 142B), and thus faces the rupture disc main body portion 132B (rupture disc main body portion 142B) of the first rupture disc 132 (second rupture disc 142). Thus, when the initiator 200 is actuated, energy of the combustion product released from the flame release opening 212A can instantly break the rupture disc main body portion 132B (rupture disc main body portion 142B) of the first rupture disc 132 (second rupture disc 142), and can quickly open the pressurized gas chamber 110 as a result. In the present embodiment, the ignition portion 211 of the initiator 200 that opens the pressurized gas chamber 110 by breaking the first rupture disc 132 (second rupture disc 142) serving as a closing member during actuation corresponds to an opening member.

When the pressurized gas chamber 110 is opened, the pressurized gas chamber 110 and the first gas emission region 171 (second gas emission region 172) communicate with each other through the first communication hole 131 (second communication hole 141) in the first partition member 130 (second partition member 140), and, as a result, the pressurized gas contained in the sealed pressurized gas chamber 110 is emitted to the first gas emission region 171 (second gas emission region 172) in the first gas chamber outer region 151 (second gas chamber outer region 152). Then, the pressurized gas emitted from the pressurized gas chamber 110 to the first gas emission region 171 (second gas emission region 172) is discharged, to the outside of the first upper side frame 62 (second upper side frame 63), from the gas discharge port 180 disposed to face the first gas emission region 171 (second gas emission region 172).

In the present embodiment, the airbag module 300 is externally attached to the first upper side frame 62 (second upper side frame 63) in a position corresponding to the gas discharge port 180 that opens to the first upper side frame 62 (second upper side frame 63). In FIG. 3, for the sake of convenience, an outer shape of the airbag module 300 is indicated by a chain line.

Figure 6:
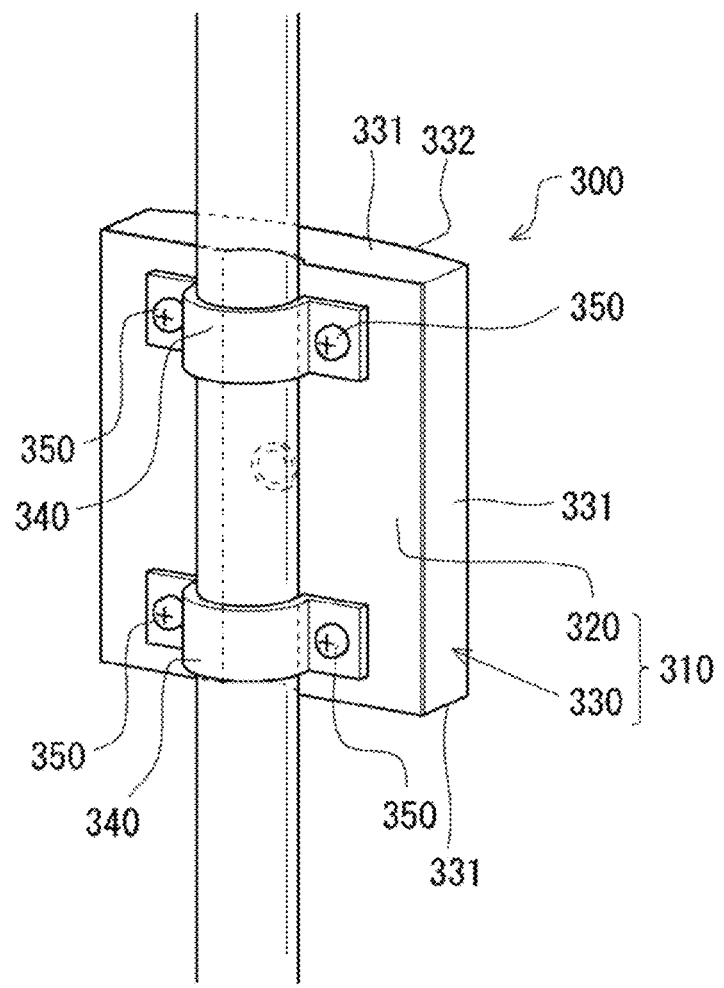
FIG. 6 is a schematic configuration diagram of an airbag module according to the first embodiment.
Figure 7:
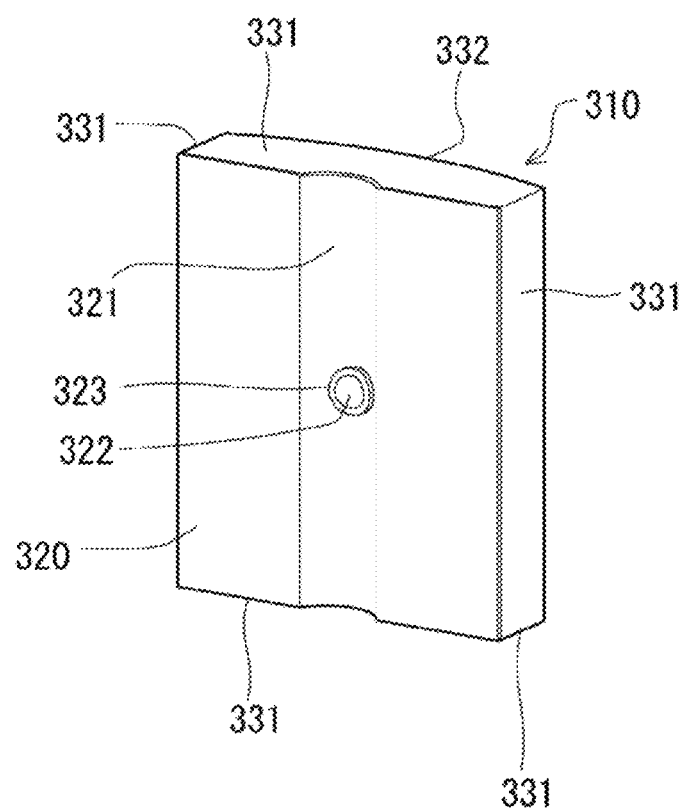
FIG. 7 is a schematic configuration diagram of the airbag module according to the first embodiment.

FIG. 6 and FIG. 7 are schematic configuration diagrams of the airbag module 300 according to the first embodiment, and illustrate perspective views of the airbag module 300 viewed from a back side. A reference sign 310 is the module case for the airbag module 300, and the airbag bag body is housed in a folded state inside the module case 310. Note that a reference sign B illustrated in FIG. 4 and FIG. 5 schematically indicates a part of the airbag bag body housed inside the module case 310. The airbag bag body 13 can be housed in the module case 310 in a known folding manner. For example, the airbag bag body B in the module case 310 may be folded in a pleated fold, may be folded in a roll fold, or may be folded in combination thereof.

As illustrated in FIG. 6 and FIG. 7, the module case 310 includes a back plate 320, a case main body 330, and the like, and is formed in a box shape as a whole. The back plate 320 is, for example, a metal plate member, and is fastened and fixed to the second pipe frame 60 (the first upper side frame 62 and the second upper side frame 63) by an attachment bracket 340, a screw 350, and the like. Note that, in FIG. 6, a screw hole of the back plate 320 is not illustrated. Further, as illustrated in FIG. 7, a recessed groove 321 for partially fitting the second pipe frame 60 (the first upper side frame 62 and the second upper side frame 63) when the back plate 320 is fixed to the second pipe frame 60

(the first upper side frame 62 and the second upper side frame 63) is provided in the back plate 320.

A gas introduction port 322 is formed, in the recessed groove 321 in the back plate 320, as a through hole that penetrates in the plate thickness direction. The gas introduction port 322 is an opening for introducing, into the module case 310, the pressurized gas discharged from the gas discharge port 180 when the pressurized gas chamber 110 is opened due to actuation of the initiator 200. Furthermore, a sealing member 323 formed in an annular shape and formed of an elastic material such as rubber is provided on a peripheral portion of the gas introduction port 322 in the recessed groove 321 of the back plate 320. For example, the sealing member 323 may be vulcanized and bonded to the recessed groove 321 in the back plate 320.

The case main body 330 of the module case 310 is configured to include a side surface portion 331 and a front surface portion 332. The case main body 330 is formed of, for example, a resin or the like. The side surface portion 331 of the case main body 330 is provided upright from the back plate 320, and forms a side surface of the module case 310. The front surface portion 332 of the case main body 330 is connected to a tip of each of the side surface portions 331 to face the back plate 320, and forms a front surface of the module case 310. Note that the side surface portion 331 in the case main body 330 and the back plate 320 can be integrally fixed by an appropriate method.

The airbag module 300 configured as described above is fastened and fixed to the first upper side frame 62 (second upper side frame 63) by using the attachment bracket 340, the screw 350, and the like, while the recessed groove 321 of the back plate 320 in the module case 310 is fitted with the first upper side frame 62 (second upper side frame 63), and the gas discharge port 180 and the gas introduction port 322 communicate with each other by aligning their positions. As an example, the airbag module 300 can be attached to each of the first upper side frame 62 and the second upper side frame 63, and thus the front surface portion 332 of the case main body 330 faces the left and right side surfaces of the vehicle seat S. In the example illustrated in FIG. 1, the airbag module 300 is attached while a surface of the front surface portion 332 in the case main body 330 of the airbag module 300 is exposed to the outside from an opening formed in the skin material U2 of the seat back S2, and is flush with a surface of the skin material U2. Furthermore, as illustrated in FIG. 1, in a center portion in a width direction of the front surface portion 332 of the case main body 330 in the present embodiment, a fragile part (tear line) 332A having a plate thickness less than that of other portions is provided along the up-down direction. The fragile part 332A in the front surface portion 332 is formed to have strength lower than that of other portions.

Note that, in the airbag device 1 according to the present embodiment, a connector of a wiring cable connected to an airbag ECU mounted an a vehicle, for example, is connected to the connector portion 220 of the initiator 200 in the inflator 100. In this way, the initiator 200 installed on the first upper side frame 62 and the second upper side frame 63 in the seat frame F is controlled by the airbag ECU. For example, when the airbag ECU detects occurrence of a collision of a vehicle based on a signal from a collision sensor (not illustrated), an actuation current (ignition current) is supplied from the airbag ECU to the initiator 200 in the inflator 100. As a result, when the initiator 200 is actuated to open the pressurized gas chamber 110, the pressurized gas is emitted from the pressurized gas chamber 110 to the first gas emission region 171 (second gas emission region 172). The pressurized gas emitted to the first gas emission region 171 (second gas emission region 172) is supplied from the gas discharge port 180 disposed to face the first gas emission region 171 (second gas emission region 172) to the airbag module 300.

Since the gas introduction port 322 of the module case 310 in the airbag module 300 communicates with the gas discharge port 180 facing the first gas emission region 171 (second gas emission region 172), the pressurized gas discharged from the gas discharge port 180 flows directly into the module case 310 through the gas introduction port 322. At this time, since the sealing, member 323 is disposed on the peripheral portion of the gas introduction port 322 in the airbag module 300, the pressurized gas discharged from the gas discharge port 180 in the first upper side frame 62 (second upper side frame 63) can be supplied from the gas introduction port 322 to the module case 310 without leakage.

When supply of the pressurized gas to the module case 310 starts, the airbag bag body B in a folded state in the module case 310 expands. As described above, since the fragile part 332A is formed in the front surface portion 332 in the case main body 330, the front surface portion 332 in the case main body 330 breaks from the fragile part 332A as a starting point due to the expansion pressure of the airbag bag body B. As a result, the airbag bag body B jumps out of the module case 310 (case main body 330) while expanding, and thus the airbag bag body B can be inflated.

Here, for example, when the vehicle seat S illustrated in FIG. 1 is a driver's seat, the airbag module 300 provided on the first upper side frame 62 corresponds to a so-called near side (door trim side when viewed from a seated person), and the airbag module 300 provided on the second upper side frame 63 corresponds to a so-called far side (side opposite to a door trim when viewed from the seated person). In this case, when the airbag ECU detects a side collision of the vehicle, an actuation timing of the initiator 200 corresponding to the near side and an actuation timing of the initiator 200 corresponding to the far side can be controlled to a suitable timing, and each of the actuation timings is not particularly limited.

Figure 8:
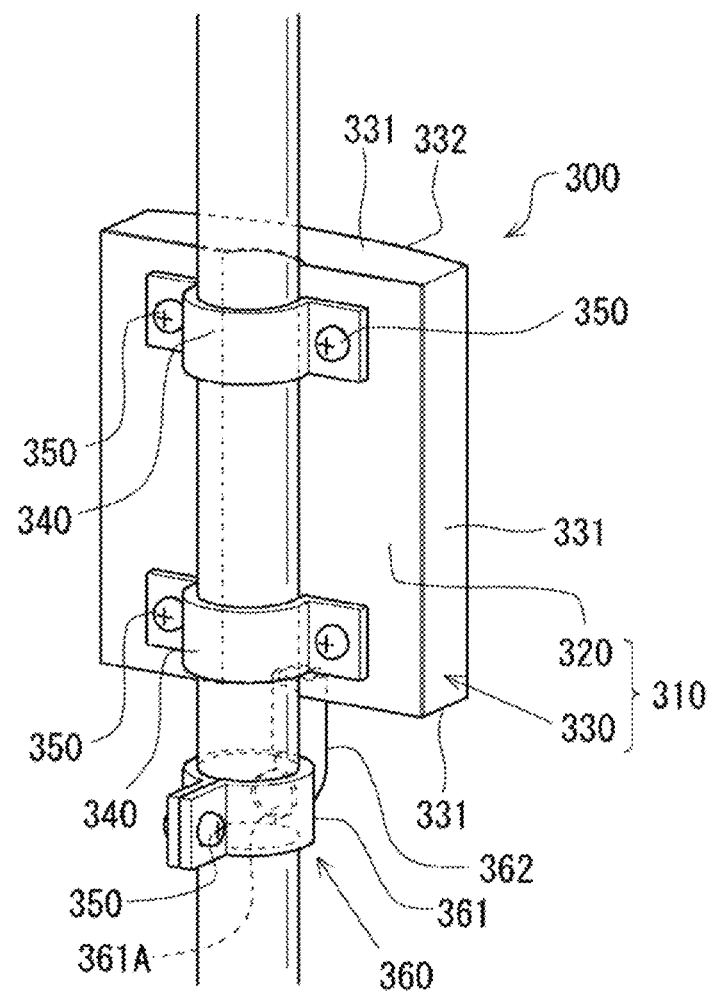
FIG. 8 is a diagram illustrating the airbag module according to a modified example.
Figure 9:
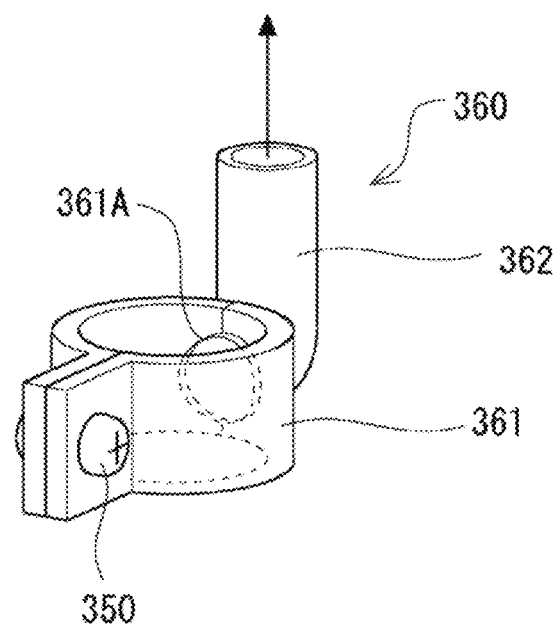
FIG. 9 is a perspective view of a connection component.

Note that an aspect of the airbag module 300 is not limited to the aspect illustrated in FIG. 6 and FIG. 7, and various aspects can be adopted. FIG. 8 is a diagram illustrating the airbag module 300 according to a modified example. The airbag module 300 according to the modified example includes a connection component 360 being an attachment member, and supplies the pressurized gas into the module case 310 via the connection component 360. FIG. 9 is a perspective view of the connection component 360. Note that, in the airbag module 300 according to the modified example, the gas introduction port 322 and the sealing member 323 illustrated in FIG. 6 are not provided in the back plate 320.

The connection component 360 is configured to include a clamp portion 361 that can externally be fitted on an outer peripheral side of the first upper side frame 62 (second upper side frame 63), and a pipe portion 362 connected to the clamp portion 361. The pipe portion 362 is a tube member having an L-shape in a side view, and a gas flow path for circulating the pressurized gas is formed therein. A gas introduction port 361A that penetrates the clamp portion 361 in the plate thickness direction is formed in the clamp portion 361, and the as flow path of the pipe portion 362 communicates with the gas introduction port 361A. A pipe insertion port for insertion of a tip side of the pipe portion 362 in the connection component 360 is formed in the side surface portion 331 in the case main body 330. Note that the sealing member 323 illustrated in FIG. 7 may be provided on a peripheral portion of the gas introduction port 361A on an inner peripheral side of the clamp portion 361.

The connection component 360 is fastened and fixed to the first upper side frame 62 (second upper side frame 63) by using a screw 356, while the clamp portion 361 is externally fitted with the first upper side frame 62 (second upper side frame 63), and positions of the gas discharge port 180 and the gas introduction port 361A are aligned. Further, the module case 310 is fastened and fixed to the first upper side frame 62 (second upper side frame 63) by using the attachment bracket 340 and the like while the tip side of the pipe portion 362 is inserted into the pipe insertion port formed m the case main body 330. Further, a gap between the pipe insertion port in the module case 310 and the pipe portion 362 inserted into the pipe insertion port can be sealed with a sealing material or the like.

When the initiator 200 is actuated, the pressurized gas chamber 110 is opened, the pressurized gas emitted from the pressurized gas chamber 110 to the first gas emission region 171 (second gas emission region 172) flows, from the gas discharge port 180, through the gas flow path of the pipe portion 362 of the connection component 360 through the gas introduction port 361A that communicates with the gas discharge port 180, and the pressurized gas is supplied into the module case 310. As a result, the airbag bag body B housed in the module case 310 expands, and the fragile part 332A breaks due to the expansion pressure of the airbag bag body B. In this way, the airbag bag body B jumps out of the module case 310 (case main body 330) and is also inflated.

Note that the airbag module 300 according to the present embodiment is described with, as an example, an aspect of housing the airbag bag body B inside the module case 310, but is not limited to this example. The airbag module 300 may be disposed on the inside of the skin material U2 in the seat back S2 without housing the airbag bag body B in the case. In this case, an example is an aspect of temporarily fixing the airbag module 300 to the first upper side frame 62 (second upper side frame 63) with using a cuttable string or the like with the airbag bag body B in a folded state, and inserting the tip side of the pipe portion 362 in the connection component 360 illustrated in FIG. 8 into the gas introduction port provided in the airbag bag body B.

Figure 10:
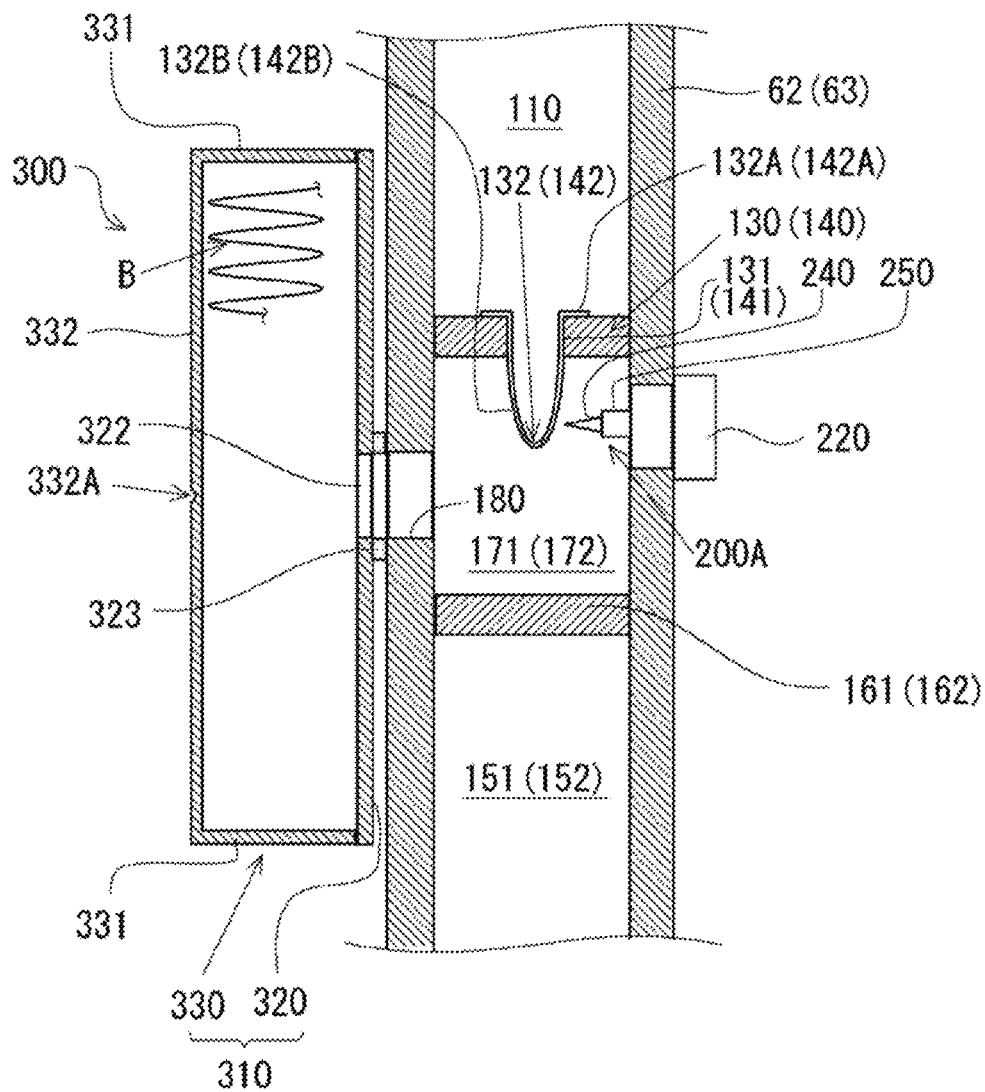
FIG. 10 is a diagram illustrating an opening member according to a modified example.

Further, in the embodiment described above, an aspect of providing the ignition portion 211 of the initiator 200 as the opening member is described as an example. However, the rupture disc main body portion 132B (rupture disc main body portion 142B) of the first rupture disc 132 (second rupture disc 142) may be broken by using an alternative member instead of the ignition portion 211 of the initiator 200, to open the pressurized gas chamber 110. FIG. 10 is a diagram illustrating an opening member according to a modified example. In the example illustrated in FIG. 10, an actuator 200A including a pin member 240 and a drive unit 250 that drives the pin member 240 is provided on the first upper side frame 62 (second upper side frame 63). The pin member 240 is a metal member with a pointed tip, and has a conical shape in the example illustrated in FIG. 10. The pin member 240 is driven by the drive unit 250 of the actuator 200A to reciprocate along an axial direction thereof.

As illustrated in FIG. 10, the pin member 240 and the drive unit 250 are disposed in the first gas emission region 171 (second gas emission region 172), and thus the rupture disc main body portion 132B (rupture disc main body portion 142B) of the first rupture disc 132 (second rupture disc 142) that protrudes toward the first gas emission region 171 (second gas emission region 172) side through the first communication hole 131 (second communication hole 141) in the first partition member 130 (second partition member 140). A position of the pin member 240 illustrated in FIG. 10 is referred to as a retracted position. The actuator 200A drives the pin member 240 in a direction approaching the rupture disc main body portion 132B (rupture disc main body portion 142B) during actuation. A method for driving the pin member 240 by the drive unit 250 of the actuator 200A is not particularly limited. The pin member 240 may be driven by using a solenoid, an electromagnetic valve, or the like, for example. An actuation current is supplied from the airbag ECU to the actuator 200A in the inflator 100 to actuate the actuator 200A, and the pin member 240 is driven in the direction approaching the rupture disc main body portion 132B (142B) from the retracted position. Then, the pin member 240 breaks the rupture disc main body portion 132B (rupture disc main body portion 142B) of the first rupture disc 132 (second rupture disc 142), and thus the pressurized gas chamber 110 can be opened. Note that, in the rupture disc main body portion 132B (rupture disc main body portion 142B) in the first rupture disc 132 (second rupture disc 142), a fragile part having, strength lower than that of other portions may be formed in advance in a position where the pin member 240 collides during actuation of the actuator 200A.

As described above, the inflator 100 in the present embodiment is formed of at least a part of the seat frame F that forms the frame of the vehicle seat S and also has a hollow structure. Then, the inflator 100 includes the seat frame housing portion 120 that forms the outer shell of the pressurized gas chamber 110 which is filled with the pressurized gas and sealed, and the partition members 130 and 140, which are disposed on the hollow side of the seat frame to isolate the pressurized gas chamber 110 and the gas chamber outer regions 151 and 152 (gas emission regions 171 and 172) adjacent to the pressurized gas chamber 110 from each other. Then, the partition members 130 and 140 are provided with the communication holes 131 and 141 communicating the pressurized gas chamber 110 and the gas chamber outer regions 151 and 152 (gas emission regions 171 and 172), and the rupture discs 132 and 142 as a closing member that closes the communication holes 131 and 141 to make the pressurized gas chamber 110 airtight. Furthermore, the inflator 100 further includes the ignition portion 211 (or the drive unit 250) and the gas discharge port 180. The ignition portion 211 of the initiator 200 (or the actuator 200A) is disposed on the hollow side of the seat frame F to face the rupture discs 132 and 142, and breaks the rupture discs 132 and 142 during actuation to open the pressurized gas chamber 110. The gas discharge port 180 is formed in the seat frame F to face the gas chamber outer regions 151 and 152 (gas emission regions 171 and 172), and discharges, from the gas chamber outer regions 151 and 152 (gas emission regions 171 and 172) to the outside, the pressurized gas flowing from the pressurized gas chamber 110 through the communication holes 131 and 141 when the initiator 200 (or the actuator 200A) opens the pressurized gas chamber 110.

Since the inflator 100 according to the present embodiment uses, for forming the pressurized gas chamber 110 as a storage space of the pressurized gas, the hollow portion of at least a part of the seat frame F, the inflator 100 can have a more compact structure as compared to a case where a housing for forming a pressurized gas chamber is separately provided outside the seat frame F. Therefore, the inflator 100 can handle a reduction in thickness of the vehicle seat S, and can be easily installed even under a condition where an attachment space cannot be sufficiently secured, Particularly, in the inflator 100, the ignition portion 211 (or the drive unit 250) of the initiator 200 (or the actuator 200) that breaks the rupture discs 132 and 142 to open the pressurized gas chamber 110 is disposed on the hollow side (gas emission regions 171 and 172) of the seat frame F, and thus the inflator 100 can be made more compact.

Further, since a housing of the inflator 100 does not need to be separately prepared when the seat frame F originally provided in the vehicle seat S is used as the housing of the pressurized gas chamber 110, a reduction in a material cost of the inflator 100 and a reduction in weight of a vehicle to which the airbag device 1 is applied can be achieved.

Further, the inflator 100 adopts a structure in which the seat frame housing portion 120 in the seat frame F forms the outer shell of the pressurized gas chamber 110, and the pressurized gas with which the hollow side of the seat frame housing portion 120 is directly filled. According to this configuration, a metal bottle for forming the pressurized gas chamber 110 or an inflator itself does not need to be disposed on the hollow side of the seat frame F, and thus a degree of flexibility in a position, an area, and the like for forming the pressurized gas chamber 110 can be increased. Since the second pipe frame 60 of the back frame F2 in the present embodiment is bent in a U-shape, and the second pipe frame 60 is directly filled with the pressurized gas, the pressurized gas chamber 110 can be formed over a wide area along the shape of the second pipe frame 60. Therefore, a sufficient amount of gas that inflates the airbag bag body B can be stored in the pressurized gas chamber 110, and thus filling pressure of the pressurized gas can be reduced, and a wall thickness of the second pipe frame 60 does not need to be increased. Thus, weight of the entire vehicle seat S including the airbag module 300 can be reduced.

Further, since the inflator 100 has an excellent degree of flexibility in a position, an area, and the like for forming the pressurized gas chamber 110, a path between the gas discharge port 180 on the inflator 100 side and the gas introduction port 322 on the airbag module 300 side can be shortened. Thus, the airbag bag body B in the airbag module 300 can be inflated in a short time. Particularly, since the airbag device 1 in the present embodiment adopts a configuration in which the gas discharge port 180 on the inflator 100 side and the gas introduction port 322 on the airbag module 300 side are directly connected to each other by aligning their positions, the airbag bag body B can be inflated quickly.

Further, since the inflator 100 can sufficiently secure a volume of the pressurized gas chamber 110 as described above, even when the pressurized gas chamber 110 is filled with the pressurized gas at low pressure, the airbag bag body B can be inflated in a short time during actuation of the inflator 100 by adjusting an opening area of the communication holes 131 and 141 and the gas discharge port 180, for example. Therefore, the inflator 100 in the present embodiment can form the seat frame housing portion 120 filled with the pressurized gas, by using a relatively inexpensive metal material commonly used as the seat frame F of the vehicle seat S. In other words, an expensive metal material used for a bottle that stores pressurized gas in a normal stored gas-type inflator may not need to be used for the seat frame housing portion 120, and thus a material cost can be suitably reduced.

Furthermore, in the inflator 100, the gas emission regions 171 and 172 adjacent to the pressurized gas chamber 110 are defined and formed by disposing the partition wall members 161 and 162 at a distance from the partition members 130 and 140 in the gas chamber outer regions 151 and 152. In the inflator 100, the ignition portion 211 (or the drive unit 250) of the initiator 200 (or the actuator 200A) is disposed in the gas emission regions 17 and 172, and the gas discharge port 180 is also disposed to face the gas emission regions 171 and 172. According to this configuration, during opening of the pressurized gas chamber 110, the pressurized gas flowing from the pressurized gas chamber 110 to the gas emission regions 171 and 172 through the communication holes 131 and 141 of the partition members 130 and 140 can be quickly supplied from the gas discharge port 180 facing the gas emission regions 171 and 172 to the airbag module 300. In other words, the gas discharge port 180 for discharging the pressurized gas to the outside of the seat frame F during opening of the pressurized gas chamber 110 can be disposed near the communication holes 131 and 141 through which the pressurized gas flows out from the pressurized gas chamber 110, and thus contributing to quick inflation of the airbag bag body B. Further, as described above, by defining and thrilling the gas emission regions 171 and 172 adjacent to the pressurized gas chamber 110 into a relatively small volume, the pressurized gas flowing from the pressurized gas chamber 110 to the gas emission regions 171 and 172 can be smoothly introduced into the gas discharge port 180, and the pressurized gas can be smoothly supplied from the gas discharge port 180 toward the airbag module 300.

Note that, in the present embodiment, an aspect of forming the seat frame housing portion 120 serving as the outer shell of the pressurized gas chamber 110 with the entire upper frame 61, a part of the first upper side frame 62, and a part of the second upper side frame 63 is described as an example, but is not limited thereto. The seat frame housing portion 120 serving as the outer shell of the pressurized gas chamber 110 may be formed of at least a part of the seat frame F. Therefore, the seat frame housing portion 120 may be formed of at least a part of the back frame F2. In this case, the seat frame housing portion 120 may be formed of at least a part of the upper frame 61 constituting the back frame F2, and at least a part of the upper side frames 62 and 63 extending downward from the end portion of the upper frame 61, in this way, a volume of the pressurized gas chamber 110 can be easily secured, and even when the pressurized gas chamber 110 is filled with the pressurized gas at low pressure, a sufficient amount of the pressurized gas can be supplied to the airbag module 300 in a short time during actuation of the inflator 100.

Further, in the present embodiment, an aspect of disposing the airbag module 300 and the initiator 200 on both of the left and right sides (i.e., both of the near side and the far side) of the back frame F2 of the seat frame F is described as an example, but is not limited thereto. For example, the airbag module 300 and the initiator 200 may be installed on either one of the near side or the far side of the back frame F2.

Further, in the inflator 100, the seat frame housing portion 120 serving as the outer shell of the pressurized gas chamber 110 may be formed of at least a part of the cushion frame 1. In this way, when the cushion frame F1 is used as the seat frame housing portion 120, the airbag device 1 may be used as a seat cushion airbag device for preventing a submarine phenomenon of a seated person (passenger). The submarine phenomenon refers to a phenomenon in which a passenger slips out of a seat belt and slides forward due to a collision of a vehicle or the like, and restraint by the seat belt is released or reduced.

Second Embodiment

Figure 11:
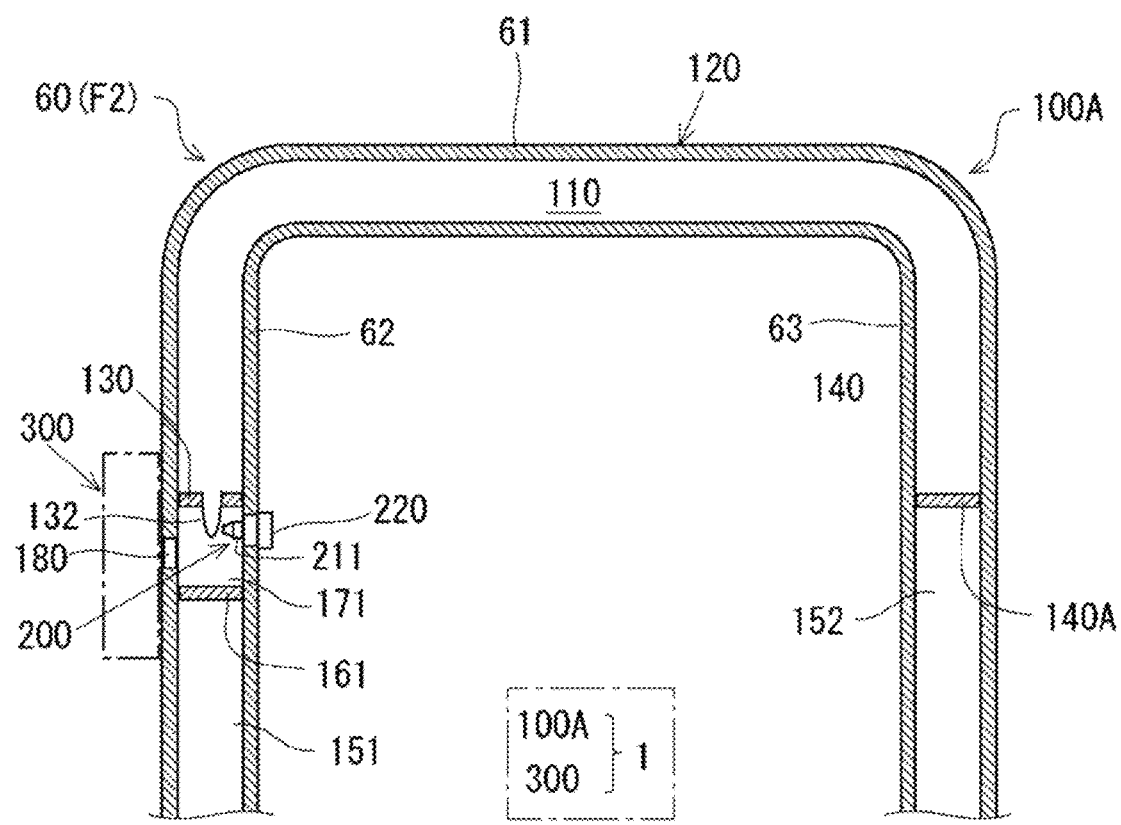
FIG. 11 is a schematic configuration diagram of an inflator according to a second embodiment.

Next, an inflator 100A according to a second embodiment will be described. FIG. 11 is a schematic configuration diagram of the inflator 100A according to the second embodiment, and is a diagram corresponding to FIG. 3 according to the first embodiment. In the inflator 100A according to the second embodiment, a configuration common to that of the inflator 100 according to the first embodiment is denoted by the same reference sign, and thus detailed, description thereof will be omitted. As illustrated in FIG. 11, in the inflator 100A according to the second embodiment, an initiator 200 is disposed only on a first upper side frame 62 in a second pipe frame 60 of a back frame F2, and the initiator 200 is not disposed on a second upper side frame 63.

As illustrated in FIG. 11, a first partition member 130 is disposed on a hollow side of the first upper side frame 62 in the second pipe frame 60, and a second partition member 140A is disposed on a hollow side of the second upper side frame 63. The second partition member 140A does not have a communication hole, and is substantially the same metal disc member as the partition wall members 161 and 162 and the like described above. The first partition member 130 disposed inside the first upper side frame 62 has the same structure as that of the first embodiment. In the inflator 100A according to the present embodiment, the hollow sides of the first upper side frame 62 and the second upper side frame 63 are partitioned by the first partition member 130 and the second partition member 140A, respectively, to define and form a pressurized gas chamber 110.

Further, in a first gas chamber outer region 151 in the first upper side frame 62, a first partition wall member 161 is disposed at a distance from the first partition member 130. In this way, a first gas emission region 171 adjacent to the pressurized gas chamber 110 is defined and formed between the first partition wall member 161 and the first partition member 130. Then, a gas discharge port 180 is formed in the first upper side frame 62, and thus faces the first gas emission region 171. Furthermore, similarly to the first embodiment, the initiator 200 is installed on the first upper side frame 62, and thus an ignition portion 211 is installed inside the first gas emission region 171. Further, an airbag module 300 is installed on the first upper side frame 62. Note that the gas discharge port 180 is not provided in the second upper side frame 63.

According to the inflator 100A configured as described above, a technical effect similar to that of the inflator 100 according to the first embodiment can be obtained even when the airbag module 300 is installed on one of a near side or a far side in a vehicle seat S. Note that, in the example illustrated in FIG. 11, an example in which the initiator 200 and the airbag module 300 are installed on the side of the first upper side frame 62 is described, but the initiator 200 and the airbag module 300 may be installed on the side of the second upper side frame 63.

Third Embodiment

Figure 12:
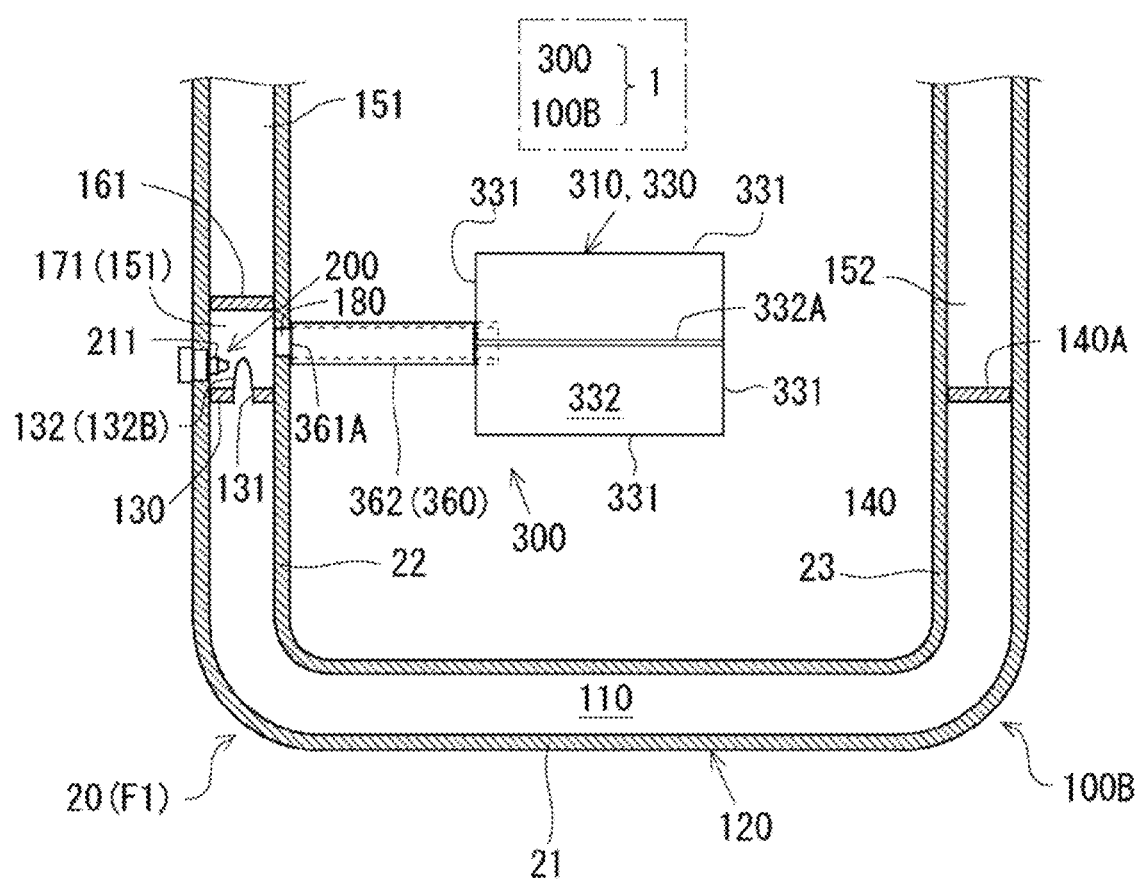
FIG. 12 is a schematic configuration diagram of an inflator according to a third embodiment.

Next, an inflator 100B according to a third embodiment will be described. FIG. 12 is a schematic configuration diagram of the inflator 1000 according to the third embodiment. In a seat frame F and the inflator 100B according, to the third embodiment, a configuration common to that of the first embodiment is denoted by the same reference sign, and thus detailed description thereof will be omitted. In the present embodiment, an aspect of using at least a part of a cushion frame F1 as a seat frame housing portion 120 serving as an outer shell of a pressurized gas chamber 110 will be described.

FIG. 12 illustrates a longitudinal cross section of a part of the cushion frame F1 in the seat frame F. As illustrated in FIG. 12, a first partition member 130 is provided on a hollow side of a first front side frame 22 in a first pipe frame 20, and thus closes an inner transverse cross section of the first front side frame 22. Further, a second partition member 140A is provided on a hollow side of a second front side frame 23 in the first pipe frame 20, and thus closes an inner transverse cross section of the second front side frame 23.

The first partition member 130 is a metal disc member having an outer diameter equal to an inner diameter of the first front side frame 22, and is welded all around to an inner peripheral surface of the first front side frame 22. A first communication hole 131 is provided in the first partition member 130, and a first rupture disc 132 closes the first communication hole 131. Further, the second partition member 140A is a metal disc member that has an outer diameter equal to an inner diameter of the second front side frame 23 and is welded all around to an inner peripheral surface of the second front side frame 23. Then, the hollow region of the first pipe frame 20 is partitioned by the first partition member 130 and the second partition member 140A described above, to define and form the pressurized gas chamber 110 filled with pressurized gas. Note that the hollow region of the first front side frame 22 is partitioned by the first partition member 130, to define and form a first gas chamber outer region 151 adjacent to the pressurized gas chamber 110. Similarly, the hollow region of the second front side frame 23 is partitioned by the second partition member 140A, to define and form a second gas chamber outer region 152 adjacent to the pressurized gas chamber 110.

As illustrated in FIG. 12, in the first gas chamber outer region 151 in the first front side frame 22, a first partition wall member 161 is disposed at a distance from the first partition member 130. As a result, a first gas emission region 171 adjacent to the pressurized gas chamber 110 is defined and formed between the first partition wall member 161 and the first partition member 130. Then, a gas discharge port 180 is formed in the first front side frame 22, and thus faces the first gas emission region 171. Further, an initiator 200 is installed on the first front side frame 22. An ignition portion 211 of the initiator 200 is disposed inside the first gas emission region 171. Furthermore, as illustrated in FIG. 12, a rupture disc main body portion 132B in the first rupture disc 132 is disposed in a state of protruding toward the first gas emission region 171 side through the first communication hole 131 of the first partition member 130.

An airbag module 300 is disposed in a position closer to a front frame 21 in a planar region surrounded by the front frame 21, the first front side frame 22, and the second front side frame 23 in the first pipe frame 20 in the cushion frame F1. The airbag module 300 includes a connection component 360 including a clamp portion 361 and a pipe portion 362 as described in FIG. 8 and FIG. 9, and the pressurized gas is supplied into a module case 310 via the connection component 360. FIG. 12 illustrates the pipe portion 362 in the connection component 360, and does not illustrate other portions in the connection component 360.

A pipe insertion port is formed in a side surface portion 331 of a case main body 330 in the module case 310, and a tip side of the pipe portion 362 in the connection component 360 is inserted into the module case 310 through the pipe insertion port. Further, the connection component 360 is fastened and fixed to the first front side frame 22 by using a screw or the like, while the clamp portion 361 (see FIG. 9) is fitted with the first front side frame 22, and positions of the gas discharge port 180 and a gas introduction port 361A are aligned. Further, the module case 310 of the airbag module 300 is fixed by an appropriate method in a posture in which a front surface portion 332 of the case main body 330 faces upward. For example, the module case 310 may be installed by using an attachment bracket that is disposed between the first upper side frame 62 and the second upper side frame 63 and has an elongated shape, or the like. Note that, as illustrated in FIG. 1, in a seat cushion S1 of a vehicle seat S, a cushion pad P1 is covered with a skin material U1. The module case 310 is disposed inside the skin material U1, and thus, for example, the front surface portion 332 of the case main body 330 faces an inner surface of the skin material U1 in the seat cushion S1, and the cushion pad P1 is not interposed between the front surface portion 332 and the skin material U1.

The inflator 100B configured as described above can use the first pipe frame 20 in the cushion frame F1 as the seat frame housing portion 120 serving as the outer shell of the pressurized gas chamber 110. When an airbag ECU detects occurrence of a collision of a vehicle, an actuation current (ignition current) is supplied from the airbag ECU to the initiator 200 in the inflator 100B. As a result, the initiator 200 is actuated, and energy of flame released from the ignition portion 211 breaks the rupture disc main body portion 132B of the first rupture disc 132, and thus the pressurized gas chamber 110 is opened. In this way, the pressurized gas with which the pressurized gas chamber 110 is filled is emitted from the first communication hole 131 of the first partition member 130 to the first gas emission region 171, and the pressurized gas is discharged from the gas discharge port 180 facing the first gas emission region 171.

As described above, the gas introduction port 361A in the pipe portion 362 (see FIG. 9) is communicatively connected to the gas discharge port 180 that opens to the first front side frame 22. Thus, the pressurized gas discharged from the gas discharge port 180 flows through a gas flow path of the pipe portion 362 through the gas introduction port 361A in the pipe portion 362, and is supplied into the module case 310. As a result, an airbag bag body B housed in the module case 310 expands, and a fragile part 332A of the front surface portion 332 breaks due to the expansion pressure of the airbag bag body B. In this way, the airbag bag body B jumps out of the module case 310 (case main body 330) and is also inflated. As a result, a front side of the skin material U1 in the seat cushion S1, for example, the skin material U1 in a position corresponding to a thigh portion of a seated person who is seated on the seat cushion S1 rises. Thus, occurrence of the submarine phenomenon described above due to an impact by a collision of a vehicle or the like can be suppressed. Note that, in the third embodiment, a front end portion of the seat cushion S1 only needs to be lifted by the airbag, and thus the front surface portion 332 may not be provided in the module case 310.

While the embodiments and modified examples of the seat frame inflator and the airbag device according to the present disclosure have been described above, the embodiments and modified examples described above can be combined with any other characteristics.

REFERENCE SIGNS LIST

1 Airbag device
B Airbag bag body
S Vehicle seat
F Seat frame
P Pad
U Skin material
S1 Seat cushion
S2 Seat back
F1 Cushion frame
F2 Back frame
20 First pipe frame
21 Front frame
22 First front side frame
23 Second front side frame
60 Second pipe frame
61 Upper frame
62 First upper side frame
63 Second upper side frame
100 Inflator
110 Pressurized gas chamber
120 Seat frame housing portion
130 First partition member
131 First communication hole
132 First rupture disc
140 Second partition member
141 Second communication hole
142 Second rupture disc
151 First gas chamber outer region
152 Second gas chamber outer region
161 First partition wall member
162 Second partition wall member
171 First gas emission region
172 Second gas emission region
180 Gas discharge port
200 Initiator
211 ignition portion
300 Airbag module
310 Module case
320 Back plate

The invention claimed is:

1. A seat frame inflator, comprising:
a seat frame housing portion formed of at least a part of a seat frame forming a frame of a vehicle seat and also including a hollow structure, and forming an outer shell of a pressurized gas chamber filled with and air-tightly containing pressurized gas and sealed;
a partition member disposed on a hollow side of the seat frame, and configured to isolate the pressurized gas chamber and a gas chamber outer region adjacent to the pressurized gas chamber from each other, the partition member being provided with
a communication hole communicating the pressurized gas chamber and the gas chamber outer region, and
a closing member configured to close the communication hole to make the pressurized gas chamber airtight;
an opening member disposed on the hollow side of the seat frame to face the closing member, and configured to break the closing member during actuation to open the pressurized gas chamber; and
a gas discharge port formed in the seat frame to face the gas chamber outer region, and configured to discharge, from the gas chamber outer region to the outside, the pressurized gas flowing from the pressurized gas chamber through the communication hole when the opening member opens the pressurized gas chamber.

2. The seat frame inflator according to claim 1, further comprising
a partition wall member disposed at a distance from the partition member in the gas chamber outer region, and configured to define and form, between the partition member and the partition wall member, a gas emission region adjacent to the pressurized gas chamber, wherein the opening member is disposed in the gas emission region, and the gas discharge port is also formed in the seat frame to face the gas emission region.

3. The seat frame inflator according to claim 1, wherein the seat frame housing portion is formed of at least a part of a back frame constituting a frame of a back portion in the vehicle seat.

4. The seat frame inflator according to claim 3, wherein the seat frame housing portion is formed of at least a part of an upper frame constituting the back frame and extending in a left-right direction, and at least a part of an upper side frame extending downward from an end portion of the upper frame.

5. The seat frame inflator according to claim 4, wherein the seat frame housing portion is formed of the entire upper frame constituting the back frame, a part of a first upper side frame extending downward from one end of the upper frame, and a part of a second upper side frame extending downward from another end of the upper frame, the partition member includes a first partition member disposed on a hollow side of the first upper side frame and also configured to isolate the pressurized gas chamber from a first gas chamber outer region adjacent to the pressurized gas chamber, and a second partition member disposed on a hollow side of the second upper side frame and also configured to isolate the pressurized gas chamber from a second gas chamber outer region adjacent to the pressurized gas chamber, and the opening member is disposed in the first gas chamber outer region, and the gas discharge port is also formed in the first upper side frame to face the first gas chamber outer region.

6. The seat frame inflator according to claim 5, wherein the opening member is further disposed in the second gas chamber outer region, and the gas discharge port is also further formed in the second upper side frame to face the second gas chamber outer region.

7. The seat frame inflator according to claim 1, wherein the seat frame housing portion is formed of at least a part of a cushion frame constituting a frame of a seat cushion portion in the vehicle seat.

8. An airbag device, comprising:
the seat frame inflator according to claim 1; and
an airbag bag body supplied with the pressurized gas discharged from the gas discharge port when the pressurized gas chamber is opened.

9. The seat frame inflator according to claim 2, wherein the seat frame housing portion is formed of at least a part of a back frame constituting a frame of a back portion in the vehicle seat.

10. The seat frame inflator according to claim 9, wherein the seat frame housing portion is formed of at least a part of an upper frame constituting the back frame and extending in a left-right direction, and at least a part of an upper side frame extending downward from an end portion of the upper frame.

11. The seat frame inflator according to claim 5, wherein the seat frame housing portion is formed of the entire upper frame constituting the back frame, a part of a first upper side frame extending downward from one end of the upper frame, and a part of a second upper side frame extending downward from another end of the upper frame, the partition member includes a first partition member disposed on a hollow side of the first upper side frame and also configured to isolate the pressurized gas chamber from a first gas chamber outer region adjacent to the pressurized gas chamber, and a second partition member disposed on a hollow side of the second upper side frame and also configured to isolate the pressurized gas chamber from a second gas chamber outer region adjacent to the pressurized gas chamber, and the opening member is disposed in the first gas chamber outer region, and the gas discharge port is also formed in the first upper side frame to face the first gas chamber outer region.

12. The seat frame inflator according to claim 11, wherein the opening member is further disposed in the second gas chamber outer region, and the gas discharge port is also further formed in the second upper side frame to face the second gas chamber outer region.

13. The seat frame inflator according to claim 2, wherein the seat frame housing portion is formed of at least a part of a cushion frame constituting a frame of a seat cushion portion in the vehicle seat.

14. An airbag device, comprising:
the seat frame inflator according to claim 2; and
an airbag bag body supplied with the pressurized gas discharged from the gas discharge port when the pressurized gas chamber is opened.

15. An airbag device, comprising:
the seat frame inflator according to claim 9; and
an airbag bag body supplied with the pressurized gas discharged from the gas discharge port when the pressurized gas chamber is opened.

16. An airbag device, comprising:
the seat frame inflator according to claim 10; and
an airbag bag body supplied with the pressurized gas discharged from the gas discharge port when the pressurized gas chamber is opened.

17. An airbag device, comprising:
the seat frame inflator according to claim 11; and
an airbag bag body supplied with the pressurized gas discharged from the gas discharge port when the pressurized gas chamber is opened.

18. An airbag device, comprising:
the seat frame inflator according to claim 12; and
an airbag bag body supplied with the pressurized gas discharged from the gas discharge port when the pressurized gas chamber is opened.

19. An airbag device, comprising:
the seat frame inflator according to claim 13; and
an airbag bag body supplied with the pressurized gas discharged from the gas discharge port when the pressurized gas chamber is opened.

* * * * *